(12) United States Patent
Edwards

(10) Patent No.: X1855
(45) Date of Patent: Dec. 30, 1812

(54) HIDES, SOFTENING, DRY

(76) Inventor: William Edwards

William Edwards   Letters Patent Dated Decr. 30. 1812.

The Schedule referred to in these Letters Patent & making part of the same containing a description in the words of the said William Edwards himself of his Hide Mill or Machine for softening dry hides.

The Hide Mill is constructed of Planks and should be four and an half feet ~~deep~~ in length three feet in width and two & an half feet deep. The Planks for the sides should be three inches in thickness the plank for the bottom two inches in thickness. This part is called the stock of the mill, the end of which should be placed towards the water wheel, which end should be open the opposite end should be made of timber twelve inches thick, the centre of which should be eight feet from the floor and placed perpendicular which should be [illegible] with the top of the Stock, the whole should be firmly framed together. The internal part of the Stock towards the end formed by timbers is made circular that the hides, when operated upon by the Hammers, may revolve as Fullers cloth does when operated upon in a fulling mill. The Hammers which operate upon the hides are two pieces of timber fifteen inches square and three & an half feet long, square at one end and taken off at the other by an angle of forty five degrees, in this end should be inserted Iron or wooden pins three quarters of an inch in diameter these pins should project three inches. The hammers are made to operate upon the Hides by moving handles of inserted within twelve inches of the square end, these handles should be made of substantial timber in size eight inches by three inches and an half inch and seventeen & an half feet in length. The hammers should have the handles pass through them by a mortice of the size of the handles & secured with wedges, Eight feet and an half from one end, leaving nine feet to each arm which are inserted in a water wheel, a mortice should be made in the timber forming one end of the Stock, four inches square and seven feet from the [illegible] of the floor, in this William Edwards Letters Patent Dated Decr 30th 1812.

The Schedule referred to in these Letters Patent, and making part of the same containing a description in the words of the said William Edwards himself of his improvement in Tanning Soal Leather.

This Improvement consists in the application of heat to the tanning of Soal leather this is done either by passing a cylinder through a vat filled with bark and water so calculated as to receive wood or other fuel at one end of the cylinder which should be inserted into the vat. the other end of the cylinder forming a right angle should rise above the top of the vat to conduct the smoke from the fire. Heat may also be applied by steam by setting a wooden vat upon a boiler connecting them together, and in various other methods. the effect is to entirely extract the tanning principle from the bark in a short time and with this produce a strong decoction of the bark which applied to the hides warm when going upon the layers, shortens the process and produces a saving of bark and time in the process.

In presence of us
Daniel Stebbins }
S. Stoddard Jr }

Signed. William Edwards

Received and Recorded anew April 3. 1843

Exd
J.J.K[illegible]

Drawing and [illegible] 1848.

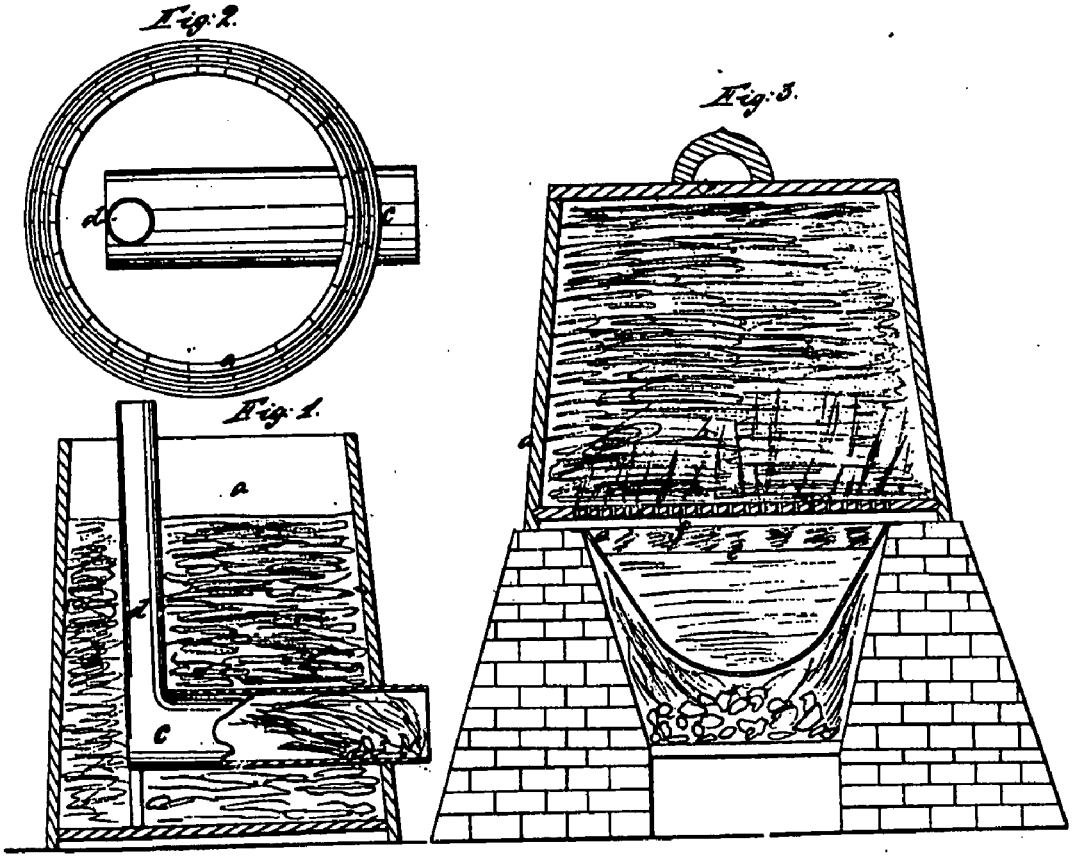

United States Patent Patent No.: X1855
W. Edwards,
Tanning Apparatus,
Patented Dec. 30, 1812.